US012792785B2

(12) United States Patent
Lindskog et al.

(10) Patent No.: US 12,792,785 B2
(45) Date of Patent: Nov. 10, 2026

(54) DIGITAL RIGHTS MANAGEMENT ON REMOTE DEVICES

(71) Applicant: TELEFONAKTIEBOLAGET LM ERICSSON (PUBL), Stockholm (SE)

(72) Inventors: Niklas Lindskog, Lund (SE); Håkan Englund, Lund (SE); Elena Dubrova, Sollentuna (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 107 days.

(21) Appl. No.: 18/847,428

(22) PCT Filed: Mar. 15, 2022

(86) PCT No.: PCT/IB2022/052341
§ 371 (c)(1),
(2) Date: Sep. 16, 2024

(87) PCT Pub. No.: WO2023/175373
PCT Pub. Date: Sep. 21, 2023

(65) Prior Publication Data
US 2025/0200228 A1 Jun. 19, 2025

(51) Int. Cl.
*G06F 21/76* (2013.01)
*H04L 9/08* (2006.01)
*H04L 9/32* (2006.01)

(52) U.S. Cl.
CPC ............ *G06F 21/76* (2013.01); *H04L 9/0869* (2013.01); *H04L 9/3242* (2013.01); *H04L 9/3278* (2013.01); *H04L 2209/603* (2013.01)

(58) Field of Classification Search
None
See application file for complete search history.

(56) References Cited

U.S. PATENT DOCUMENTS 9,584,329 B1 2/2017 Trimberger
2005/0012648 A1* 1/2005 Marpe .................... H04N 19/61 341/107

(Continued)

FOREIGN PATENT DOCUMENTS

| | | | |
|---|---|---|---|
| CN | 109040067 | A | 12/2018 |
| EP | 3214613 | B1 | 7/2020 |
| IN | 201841040836 | A | 5/2020 |

OTHER PUBLICATIONS

Che et al., "A Privacy-Preserving, Mutual PUF-Based Authentication Protocol", Cryptography, Chapter 1 and 4, Nov. 25, 2016.

(Continued)

*Primary Examiner* — William J. Goodchild
(74) *Attorney, Agent, or Firm* — Baker Botts L.L.P.

(57) ABSTRACT

According to some embodiments, a method performed by a client device comprises transmitting a first binary to a network device. The first binary comprises a k-bit secret K. The method further comprises: selecting a first set of initialization values (IVs) from a set of all possible IVs associated with a device unique function associated with the network device; transmitting the first set of IVs to the network device; and receiving from the network device a set of device unique function responses. The device unique function responses are generated based on challenges derived from the first set of IVs and the secret K. The method further comprises applying a transformation to the set of device unique function responses resulting in a transformation vector.

23 Claims, 11 Drawing Sheets

(56) References Cited

U.S. PATENT DOCUMENTS

| | | | | |
|---|---|---|---|---|
| 2011/0191837 | A1* | 8/2011 | Guajardo Merchan ...................... | H04L 9/3278 726/6 |
| 2018/0145838 | A1* | 5/2018 | Wang .................... | H04L 9/3278 |
| 2019/0305927 | A1 | 10/2019 | Bhunia et al. | |

OTHER PUBLICATIONS

Hoffman et al., "Stealthy Opaque Predicates in Hardware—Obfuscating Constant Expressions at Negligible Overhead", IACR Transactions on Cryptographic Hardware and Embedded Systems, 2018, vol. 2, pp. 277-297.

Li et al., "Secure Key Storage Using State Machines", 2013 IEEE 43rd International Symposium on Multiple-Valued Logic, IEEE Computer Society, pp. 290-295, 2013.

Lindskog et al., "Secure acceleration on cloud-based FPGAs—FPGA enclaves", 2020 IEEE International Parallel and Distributed Processing Symposium Workshops. IEEE, 2020, pp. 119-122.

Roy et al., "Combining PUF with RLUTs: A Two Party Pay Per Device IP Licensing Scheme On FPGAs", ACM Transactions on Embedded Computing Systems (TECS), 18(2), pp. 1-22, Nov. 2020.

Zhang, A PUF-FSM Binding Scheme for FPGA IP Protection and Pay-Per-Device Licensing, IEEE Transactions on Information Forensics and Security, vol. 10, No. 6, 2015, pp. 1137-1150.

* cited by examiner

1100

DIGITAL RIGHTS MANAGEMENT ON REMOTE DEVICES

PRIORITY CLAIM

This application is a national stage application of International Patent Application No. PCT/IB2022/052341, filed Mar. 15, 2022, the disclosure disclosures of which s hereby incorporated in its entirety by reference.

TECHNICAL FIELD

Particular embodiments relate to digital rights management (DRM), and more specifically DRM for protecting bitstreams on remote devices.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

A cryptographic algorithm for electronic authentication may incorporate the usage of a PUF. A PUF is a physical object that for a given input and conditions, provides a physically defined output that may serve as a unique identifier, for example, for a semiconductor device such as a microprocessor. PUFs may be based on unique physical variations which occur naturally during semiconductor manufacturing. A PUF is used to create a unique response by using implicit or explicit randomness. To create a PUF response, the PUF is fed a challenge, usually a binary string of a fixed length. The response may be used, for example, for cryptographic or device identity purposes.

One benefit of using a PUF is that two identical PUF implementations on different devices/components will result in different responses when fed the same challenges. This is the "unclonable" portion of physically unclonable function.

Implicit randomness is unpredictable manufacturing differences in semiconductor devices that may be used to create a device-unique response. Explicit randomness, on the other hand, means that the introduction of randomness requires extra steps during manufacturing or a later stage, e.g., at packaging.

A PUF may consist of one or several subfunctions, where each contributes with a part of the PUF response. One example of a subfunction includes ring-oscillators, which use an uneven number of signal inverters in a ring that uses gate delay propagation as the randomness source. The response is a comparison between two or more ring-oscillators where the number of oscillations at a given point is measured. The result may, e.g., be the identifier of the fastest/slowest ring oscillator.

Another subfunction example includes uninitialized static random access (SRAM) memory cells, which have two possible states (0 and 1). Prior to power up, the cell is in neither state. At powerup, the cell stabilizes in one of the two states. The response is the entered state.

Another subfunction example is an arbiter. An arbiter may be regarded as a digital race condition between two or more signal paths on a chip where an arbiter circuit identifies the winning signal. The paths may comprise several switch blocks, which can alter the signal paths. For example, the PUF response may be an identification of the winning signal.

The PUF response may be used to create a unique device identity or a device unique key, without having to store the key in, e.g., battery backed RAM (BBRAM) or one time programmable (OTP) memory. Thus, it is much harder for an attacker to steal a key from a device using a PUF, because the key is not present in the device while the device is powered off.

There are several types of PUFs, but they can generally be divided into two different categories, those capable of few challenge response pairs (CRPs) and those having a large set of CRPs. The latter may produce several different responses by using different challenges as input. The former only allows one or a few challenges. If the PUF only accepts a single challenge, the challenge may be hard-coded or omitted.

Most PUF types additionally require error correcting codes (often denoted as helper data) to function properly, i.e., to increase the possibility of recreating the same response given the same challenge.

Some PUF types can remap the challenge-response mapping one or several times. After a remap, some or all challenges result in new responses. An example of this is reconfigurable PUFs that can alter the entire challenge space, i.e., that all challenges receive a new response. An erasable PUF, on the other hand, is a PUF that has the possibility to change response of specific challenges. Alternatively, an erasable PUF might respond with a null value, for example all zeros, for challenges marked as "erased".

When a PUF response (or a derivation thereof) is used to encrypt another cryptographic key, the PUF response is referred to as a "key encryption key" or KEK for short.

A field programmable gate array (FPGA) is an integrated circuit designed to be programmed after manufacturing, thus the term "field-programmable". It contains configurable logic blocks (CLBs) that can be used and connected differently to determine the functionality of the FPGA. The entirety of CLBs on a device is referred to as programmable logic (PL).

Apart from PL, an FPGA often has input/output ports (I/O), on- and off-chip RAM and other peripherals. Some FPGAs include their own processing subsystem (PS), sometimes referred to as hard processors. These devices are generally referred to as SoC (System-on-Chip) FPGAs.

At startup, an FPGA is booted via a configuration stored either on a memory card or provided through joint test action group (JTAG)/serial peripheral interface (SPI).

The configuration consists of several components. A few examples include: bootloader software that is responsible for loading and configuring other components; one or several bitstreams, configuring the PL; platform management unit software responsible for monitoring resources, controlling reset and power-up; one or several software applications running in PS; and configuration for application specific integrated circuits (ASICs_, e.g., specialized hard accelerators.

To ensure that only a trusted configuration can be loaded, each part of the configuration may be individually confidentiality or/and integrity protected.

A bitstream can comprise one or several intellectual property (IP) blocks that deliver certain functionality to the bitstream. Examples of such IP blocks include a cryptographic module or a proprietary protocol decoder.

The secure boot procedure requires the root encryption and/or root authentication keys to be programmed on the FPGA before uploading a configuration.

Partial reconfiguration (PR) enables an FPGA developer to define distinct physical areas on the FPGA that can be reconfigured with individual (partial) bitstreams. The reconfiguration can be done during runtime without impacting the rest of the device. A partial bitstream contains only hardware design for a pre-determined area.

The description herein may refer to FPGAs, SoCs and adaptable computing acceleration platforms (ACAP) (a SoC FPGA that contains additional logic designed for artificial intelligence (AI) computations) interchangeably as FPGAs.

Furthermore, the term "soft" refers to something implemented in PL while "hard" is a physical implementation. For example, a soft central processing unit (CPU) is a CPU instance built from PL and hard CPU is physical CPU present on the device.

The FPGA has for several decades been something of a niche device, not generally available outside academia and industries such as telecommunications, defense, and industrial automation. However, as computationally intensive algorithms, present in e.g., machine learning, gain in popularity, the need for specialized acceleration has increased massively.

The heterogeneous and reprogrammable nature of FPGAs fits these needs and has opened up new use cases for these devices. Driven by the demand for FPGA acceleration, several cloud providers have started to offer FPGA-as-a-service (FaaS).

FaaS is a device-specific version of infrastructure-as-a-service (IaaS). FaaS is a concept where the FPGA is offered as pay-per-use and gives the users almost the same capabilities as they would have owning the device.

In a FaaS setting, the FPGA may be described as two separate planes. The programmable plane, or "role',' is the part of the device available to the end-user for deploying bitstreams and applications. If the programmable plane is divided into several sections being used for different tasks or by different users, the programmable plane is said to be divided into several roles. The FPGA also contains a control plane, or "shell," which is controlled by the hardware owner (HwO). It contains, e.g., the bitstream programmer and security peripherals.

FaaS solutions do not currently support remote attestation, i.e., ensuring that the FPGA is in an expected state prior to exposing data.

Some proposals include a technique to generate node locked and cloning protection. In these proposals, the original equipment manufacturer (OEM) is considered as a trusted part. The OEM performs authentication and keeps keys secret. The challenge response procedure may be based on a PUF on the device. Keys are based on a device identifier and may periodically change. Permutations are used to obfuscate the bitstream. These proposals are focused on the obfuscation part and require the OEM to be involved in the unlocking procedure.

Other proposals enforce licensing of IPs and pay-per-device on based on a public key that corresponds to a private key on the FPGA. The private key may be generated by a PUF. The IP is supplied to the FPGA in a locked/blocked state that can only be unlocked on a device that can create the correct private key. The proposals, however, require pre-loaded cryptographic keys and do not describe how the blocked state is achieved by using the key.

Some proposals restrict unlicensed IPs to communicate with other IPs. The proposal is based on each IP component having a unique key. To generate the unique key each IP core has its own chip ID generation circuit, e.g., a PUF device embedded into the IP core, which uniquely characterizes the IP core. Information that is sent from IP-A to IP-B must go through a monitor component that decrypts with IP-A's unique key and then encrypts with IP-B's unique key. If the monitor component and the respective IP do not share the same key, information cannot be decrypted correctly. These proposals require a monitor component with prior knowledge of all IP's PUF responses.

There currently exist certain challenges. For example, because of the increasing number of FaaS offerings, protecting FPGA based IP from over-deployment is a growing problem. Over-deployment is defined as a customer using a licensed IP in more instances than for which the customer has purchased licenses. This creates a problem for third-party IP providers because no adequate solutions exist on contemporary FPGAs.

Various academic papers, such as "Combining PUF with RLUTs: A Two Party Pay Per Device IP Licensing Scheme On FPGAs," Debapriys Basu roy et. al., ACM Transactions on Embedded Computing Systems (TECS), 18(2), 1-22 and "A PUF-FSM binding scheme for FPGA IP protection and pay-per-device licensing, Zhang, Jiliang, et al., IEEE Transactions on Information Forensics and Security, 2015, 10.6: 1137-1150, suggest solving this by using a device unique function, such as PUF. However, these all require cooperation from the HwO/TTP or require a cryptographic engine with a secret key as well as communication with the IP provider during deployment.

None of the above-mentioned proposals solve the licensing problem seamlessly but requires the need of cooperation from a TTP, pre-loaded cryptographic keys or a monitor component with prior knowledge of all IP's PUF responses.

Furthermore, current proposals cannot extract PUF challenge-response pairs from an external to use at a later point in time without the owner of the device being able to reproduce the result. Because the owner of the device can use the PUF at any time, challenge(s) supplied in cleartext reveal the PUF responses, even if the PUF has a vast challenge-response space.

If the challenges are sent encrypted, the current solutions include a key that must be present on the device. This is generally not possible without exposing the key to the device owner.

SUMMARY

As described above, certain challenges currently exist with digital rights management (DRM) for protecting binaries (e.g., bitstreams for configuring programmable logic or machine code intended to be executed on a processing element, for example central processing unit (CP)U or general processing unit (GPU)) on remote devices (e.g., infrastructure as a service (IaaS) devices). Machine code in this instance should be interpreted as the output of a compiler and may encompass both machine code, byte code, object code and similar constructs.

Certain aspects of the present disclosure and their embodiments may provide solutions to these or other challenges. For example, particular embodiments are applicable where a tenant/user rents an external device (also referred to as remote device or network device), e.g. as a part of an IaaS offering (e.g., field programmable gate array (FPGA)-as-a-service (FaaS)) where the tenant/user does not want to expose the bitstream to the owner of the external device. The tenant/user may also be an intellectual property (IP) provider who wishes to create IPs that only function on a specific device for future licensing, provided that the device-unique function is unclonable.

A pre-requisite for the external device is that it has, or has the ability to create, a device unique function with a vast (large enough to be unclonable) number of challenge-response pairs (CRPs), either in programmable logic or as a hardware implementation. The device unique function may comprise a physically unclonable function (PUF) or a device unique message authentication code (MAC), i.e., a MAC keyed with a device unique secret key.

Particular embodiments extract a transformation vector (also referred to as a "tweak") without exposing the CRPs. The transformation vector is used to create a bitstream/binary that can only be unlocked on the specific device. The same set of challenges may be derived in multiple sessions while an eavesdropper is not able to perform replay attacks nor derive the challenges used. The challenges used to produce each response are created using a session unique-part and a secret part hidden within the bitstream/binary.

In some embodiments, the device is an FPGA and the tenant supplies a first bitstream with a pseudo-random number generator (PRNG) and a secret. The secret is hidden using a technique referred to as "camouflaging" within the first bitstream. Camouflaging may comprise inserting opaque predicates, encoding the secret into a finite state register (FSR) or other techniques for obfuscating data in the bitstream. The secret is used, together with a nonce and a first element tenant-supplied initialization value (IV) to create a seed for the PRNG. The output of the PRNG is combined with subsequent elements in the set of IVs to create the challenges. The challenges are supplied to the device-unique function, which produces a vector of responses. The set of IVs are either selected, e.g., independently and uniformly at random or deterministically, from a set of all possible IVs associated with a device unique function associated with the network device; or derived from at least one already existing set of IVs.

The vector of responses is returned to the tenant and is transformed by the tenant after reception. The transformation vector becomes the "tweak." The transformation vector is used to securely setup a second bitstream that contains the same secret but may differ in contents. Moreover, the second bitstream is built expecting the transformation vector as input. The transformation vector may be used to unlock certain functionality within the bitstream or to make certain functions behave correctly in the bitstream. The second bitstream may also contain a true random number generator (TRNG) to enable the creation of a nonce, which makes every session unique.

While particular embodiments are described with respect to an FPGA context, the particular embodiments are also applicable to other components, e.g., CPUs or GPUs.

In general, particular embodiments enable DRM and prevent over-deployment in an Infrastructure-as-a-service environment. Particular embodiments extract challenge-response pairs (CRPs) from a device-unique function on an external device. The CRPs are used to establish a reusable and device-unique transformation vector for the remote device, unknown to the device owner, that can be recreated without being stored on the device. Each recreation of the transformation vector uses a random component to protect against replay.

A first bitstream or software binary is supplied to the remote device to extract the CRPs from the remote device. The first bitstream or software binary creates the challenges on the device by using a hidden secret or the first IP receives the challenges from outside and decrypts them by using a hidden secret.

The transformation vector is used to lock a second bitstream or software binary to only function on the remote device. The second bitstream or software binary additionally requires the client to supply an IV or an encrypted challenge vector to successfully recreate the transformation vector.

The device-unique function may be a PUF or a keyed MAC and the device-unique function is instantiated as a part of the bitstream or software binary, or a hardware implementation on the remote device.

According to some embodiments, a method performed by a client device comprises transmitting a first binary to a network device. The first binary comprises a k-bit secret K. The method further comprises: selecting a first set of initialization values (IVs) from a set of all possible IVs associated with a device unique function associated with the network device; transmitting the first set of IVs to the network device; and receiving from the network device a set of device unique function responses. The device unique function responses are generated based on challenges derived from the first set of IVs and the secret K. The method further comprises applying a transformation to the set of device unique function responses resulting in a transformation vector.

In particular embodiments, the method further comprises transmitting a second binary to the network device. The second binary comprises the k-bit secret K, and operation of the second binary is dependent on the transformation vector. The method further comprises deriving a second set of IVs based on at least the first set of IVs and transmitting the second set of IVs to the network device.

In particular embodiments, the transformation comprises one or more of a permutation, substitution, masking, demasking, encryption, and decryption. The secret K may be camouflaged.

In particular embodiments, the first binary and the second binary further comprise one or more of a one way function H, a random number generator G, and the device unique function.

In particular embodiments, operation of the second binary is dependent on the transformation vector to provide input to a state machine or logic gates. Operation of the second binary may be dependent on the transformation vector to generate a cryptographic key.

In particular embodiments, the network device comprises a FPGA and the first and second binaries comprise programmable logic instructions. The network device may comprise a processing element and the first and second binaries may comprise machine code.

In particular embodiments, the device unique function comprises one of a physically unclonable function (PUF) and a message authentication code (MAC). The device unique function may be implemented as one or more of a hardware implementation on the network device, a part of the first binary and a part of the second binary.

According to some embodiments, a client device comprises processing circuitry operable to perform any of the client device methods described above.

Also disclosed is a computer program product comprising a non-transitory computer readable medium storing computer readable program code, the computer readable program code operable, when executed by processing circuitry to perform any of the methods performed by the client device described above.

According to some embodiments, a method performed by a network device comprises receiving a first binary from a client device. The first binary comprises a k-bit secret K. The method further comprises: receiving from the client device a selected first set of initialization values (IVs) from a set of all possible IVs associated with a device unique function associated with the network device; generating device unique function responses based on challenges derived from the first set of IVs and the secret K; and transmitting the device unique function responses to the client device.

In particular embodiments, the method further comprises receiving a second binary from the client device. The second binary comprises the k-bit secret K, and operation of the second binary is dependent on a transformation vector. The method further comprises: receiving from the client device derived second set of IVs based on at least the first set of IVs; determining the transformation vector based on the second set of IVs, the secret K, and the device unique function; and executing the second binary based on the determined transformation vector.

According to some embodiments, a network device comprises processing circuitry operable to perform any of the network device methods described above.

Also disclosed is another computer program product comprising a non-transitory computer readable medium storing computer readable program code, the computer readable program code operable, when executed by processing circuitry to perform any of the methods performed by the network device described above.

Certain embodiments may provide one or more of the following technical advantages. For example, particular embodiments provide a DRM protection scheme without the need to actively trust the hardware owner or require any hardware changes to contemporary devices.

Furthermore, particular embodiments may lock a bitstream/software binary to a specific device, thus protecting it from being stolen by, e.g., a rogue device owner or cloud service insider.

A benefit of particular embodiments is that the device unique function, e.g., a PUF, does not have to be secret from the device owner. The owner may extract any CRPs as long as the CRP space is large enough to make the extraction of the transformation vector by a brute-force enumeration of CRPs infeasible.

Even if the device owner has access to both cleartext bitstreams and has observed the communication, the CRP's cannot be retrieved as long as the camouflaged secret cannot be successfully reverse engineered, the transformation vector cannot be calculated by re-deploying the first bitstream on the same (or any other) device because the transformation scheme is only known by the user, the second bitstream cannot be used on the same device because the nonce invalidates previous IVs, and the second bitstream cannot be used on a different device, because a different device will not be able to re-create the transformation vector correctly because PUF responses are unique for each device.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, certain challenges currently exist with digital rights management (DRM) for protecting bitstreams and software binaries on remote devices (e.g., infrastructure as a service (IaaS) devices). Certain aspects of the present disclosure and their embodiments may provide solutions to these or other challenges. For example, particular embodiments extract challenge-response pairs (CRPs) from a device-unique function on an external device. The CRPs are used to establish a reusable and device-unique transformation vector for the remote device, unknown to the device owner, that can be recreated without being stored on the device. Each recreation of the transformation vector uses a random component to protect against replay.

A first bitstream or software binary is supplied to the remote device to extract the CRPs from the remote device. The first bitstream or software binary creates the challenges on the device by using a hidden secret.

The transformation vector is used to lock a second bitstream or software binary to only function on the remote device. The second bitstream or software binary additionally requires the client to supply an initialization value (IV) vector or an encrypted challenge vector to successfully recreate the permutation vector.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
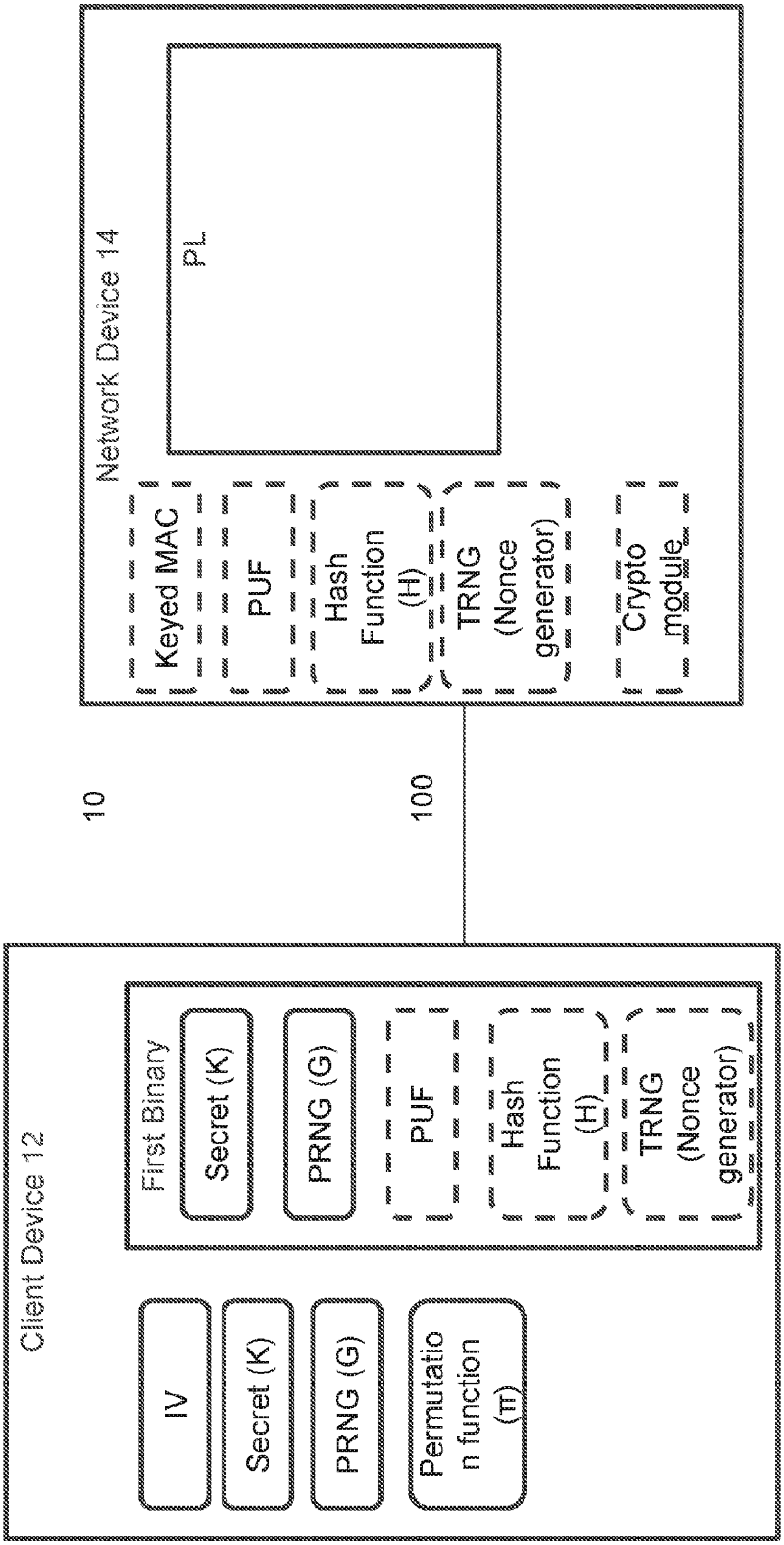
FIG. 1 is a block diagram illustrating the components of a digital rights management (DRM) system, according to particular embodiments.

FIG. 1 is a block diagram illustrating the components of a DRM system, according to particular embodiments. DRM system 10 includes client device 12 communicably coupled via network 100 to network device 14.

Client device 12 may comprise a user or tenant device of network device 14. Network device 14 may comprise any IaaS device, such as field programmable gate arrays (FPGAs), systems on a chip (SoCs), adaptable computing acceleration platforms (ACAP) (a SoC FPGA that contains additional logic designed for artificial intelligence (AI) computations), or any other network device provided as a service to the user or tenant.

Client device 12 may include a combination of processing circuitry, software, and memory that include an initialization vector (IV), secret (K), pseudo random number generator (PRNG) (G), permutation function (π), and a first binary (e.g., bitstream or machine code). The first binary also includes secret (K) and PRNG (G). The first binary may also include a physically unclonable function (PUF), a hash function (H), and/or true random number generator (TRNG) for generating nonces.

Network device 14 may include a combination of processing circuitry, software, and memory that includes programmable logic (PL). Network device 14 may also include one or more of a keyed MAC, PUF, hash function (H), TRNG for generating nonces, and/or a crypto module.

Network 100 comprises a plurality of network nodes configured to communicate data between client device 12 and network device 14. Examples of network nodes include, but are not limited to, routers, switches, modems, web clients, and web servers. Network 100 comprises any suitable type of wireless and/or wired network including, but not limited to, all or a portion of the Internet, the public switched telephone network, a cellular network, and/or a satellite network. Network 100 is configured to support any suitable communication protocols as would be appreciated by one of ordinary skill in the art upon viewing this disclosure.

Although particular examples are described in the context of an FPGA where the device-unique function is a PUF, the embodiments are applicable to other platforms as well.

The method described does not consider emulation of FPGA devices (i.e., the remote FPGA being impersonated by the cloud provider) as an attack vector. This problem is handled by remote attestation solutions such as "Secure Acceleration on Cloud-Based FPGAs-FPGA enclaves," Englund, Håkan; Lindskog, Niklas, 2020 IEEE International Parallel and Distributed Processing Symposium Workshops (IPDPSW). IEEE, 2020. p. 119-122.

The transformation vector T is a device-unique long-term value that the user can establish and re-generate repeatedly without the hardware owner being able to do the same.

As illustrated in FIG. 1, the PUF takes n-bit input and outputs p bits, i.e. a PUF with $2^n$ challenges. An example of such a PUF is an arbiter PUF. An adequate p for a non-traversable challenge space may be 128.

K is a k-bit secret value, preferably at least 128 bits long. The secret permutation π is an m-element secret permutation. Although a secret permutation is illustrated in the example, the secret permutation is just one example of a transformation. The transformation may comprise one or more of a permutation, substitution, masking, demasking, encryption, and/or decryption.

Initialization values (IVs) comprise n bit long values. H is a cryptographically secure one way function, e.g. a hash or a message authentication code (MAC) function, which may be embodied by a function that maps arbitrarily long (l) message bits into (h) bits, i.e., H: $\{0,1\}^l \rightarrow \{0,1\}^h$.

G is a pseudo-random number generator G generating n-bit numbers from a h-bit seed (S). After being initialize with the seed S, an initialization procedure is performed, and the first output from G is denoted $G^1(S)$, hence, $G^i(S)$ denotes the n-bit value/number that is generated by G i steps after having been seeded by seed S generated, for i=1, 2 . . . . Vectors of output values produced by G may be referred to as masks and will use the following notations, let X (and similarly Y) denote an m element mask $X_{1:m}=[X_1, \ldots, X_m]$.

In the illustrated example, the network device is owned by a hardware owner, who is different from the user or client of the network device (e.g., FPGA). The hardware owner has access to make queries to the PUF but the CRP space is too large to store. The user knows the secret key K that is stored in the bitstream. The hardware owner does not know and cannot determine K. Only the user knows the m-element secret permutation π. The one-way function H and the pseudo-random number generator G are implemented in the network device or bitstream and are not secret. There is no secure communication channel between the user and the PUF.

Figure 2:
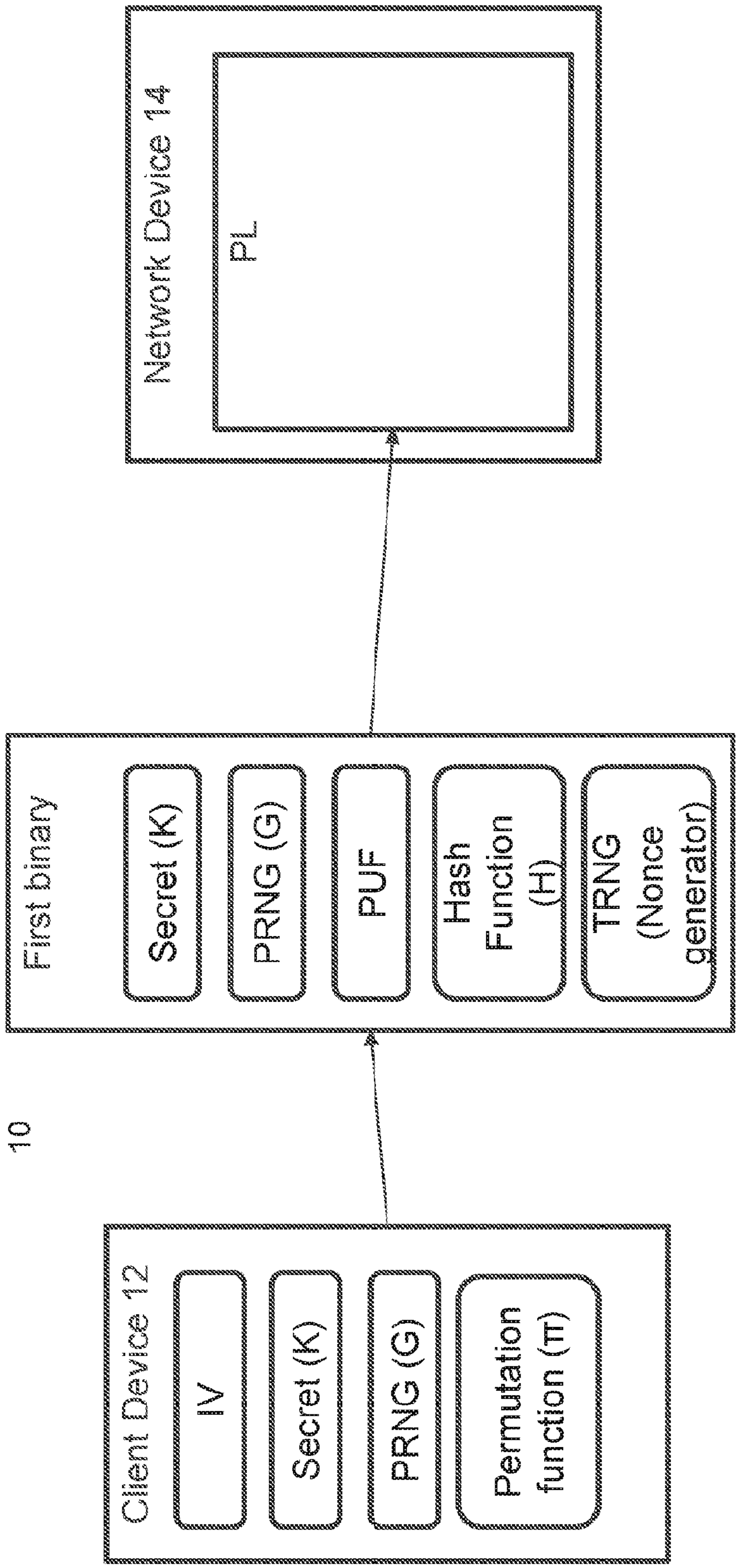
FIG. 2 is a block diagram illustrating the components of a DRM system during the transformation vector initialization stage, according to particular embodiments.

FIG. 2 is a block diagram illustrating the components of a DRM system during the transformation vector initialization stage, according to particular embodiments. The components of FIG. 2 are the same as those described with respect to FIG. 1. In the illustrated example, client device 12 transmits the first binary (e.g., bitstream or machine code) to network device 14. Examples of the transformation initialization stage are illustrated with respect to FIGS. 4, 6 and 7.

Figure 3:
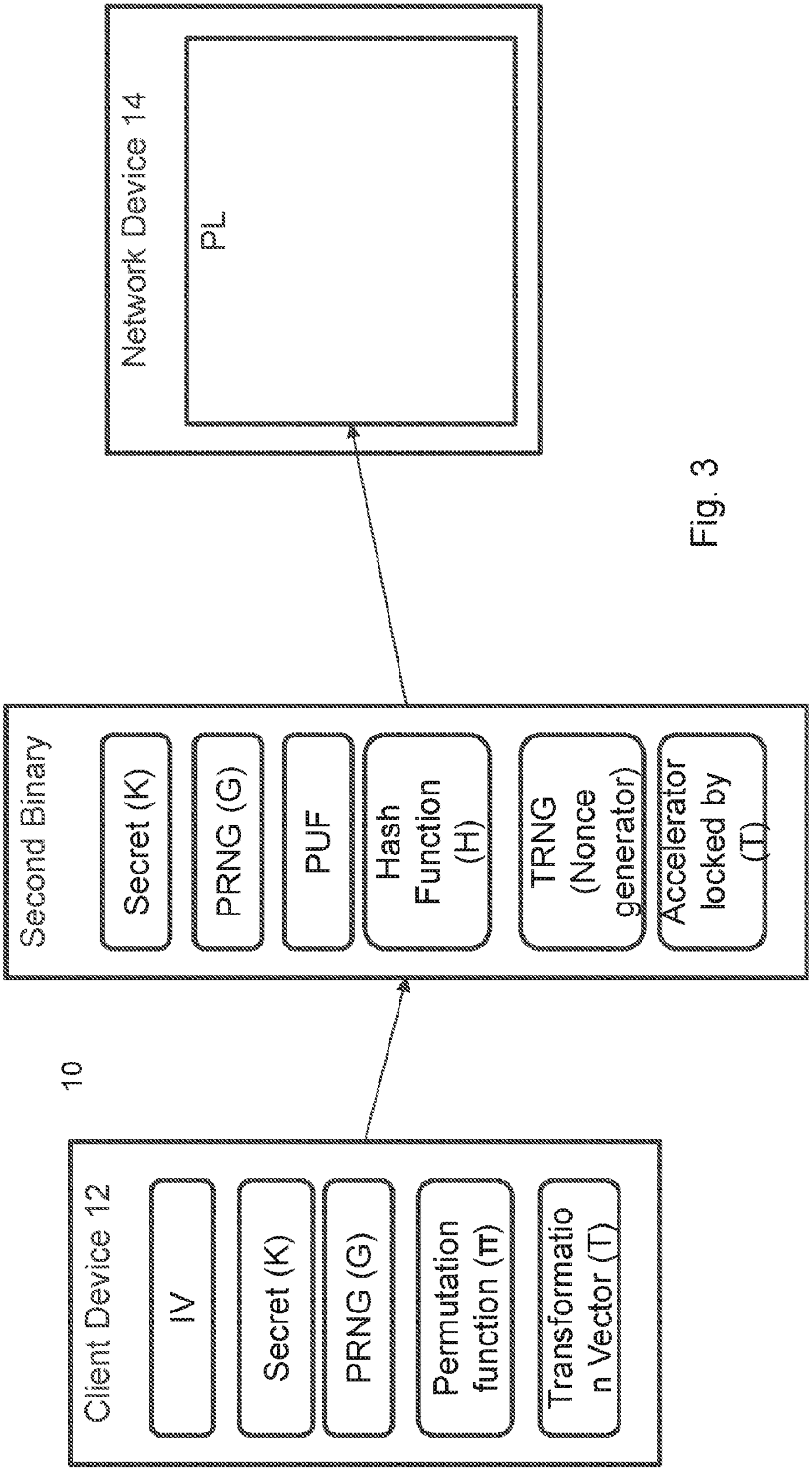
FIG. 3 is a block diagram illustrating the components of a DRM system during the transformation vector recreation stage, according to particular embodiments.

FIG. 3 is a block diagram illustrating the components of a DRM system during the transformation vector recreation stage, according to particular embodiments. The components of FIG. 3 are the same as those described with respect to FIGS. 1 and 2.

In addition to the components illustrated with respect to FIGS. 1 and 2, client device 12 also includes transformation vector (T) generated during the transformation vector initialization stage. The second binary includes an accelerator or other functionality block which is locked by the transformation vector (T). The accelerator may be operable to prevent execution of the second binary unless unlocked with the transformation vector (T).

Figure 5:
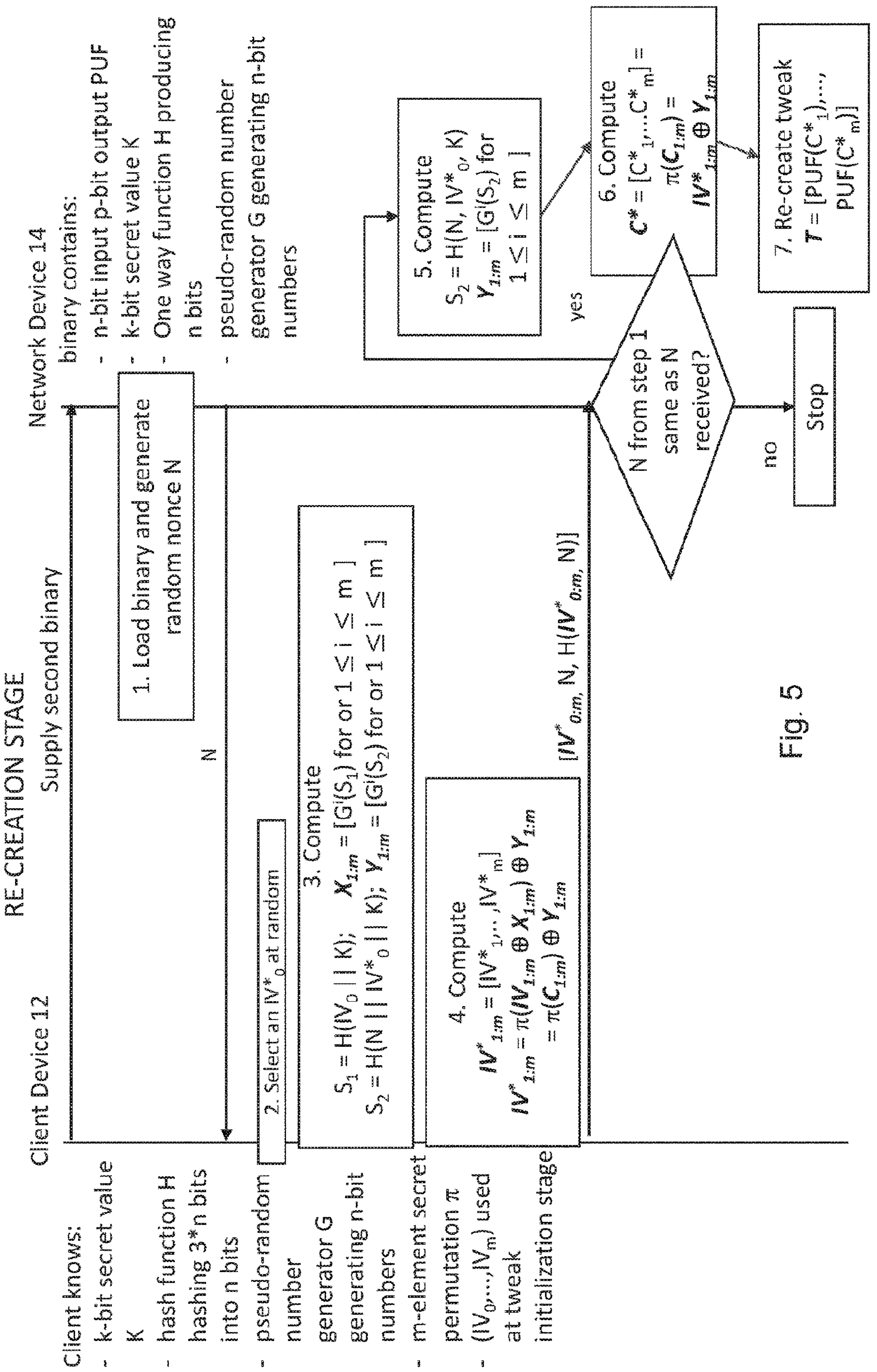
FIG. 5 is a flow diagram illustrating an example of a transformation vector recreation.
Figure 8:
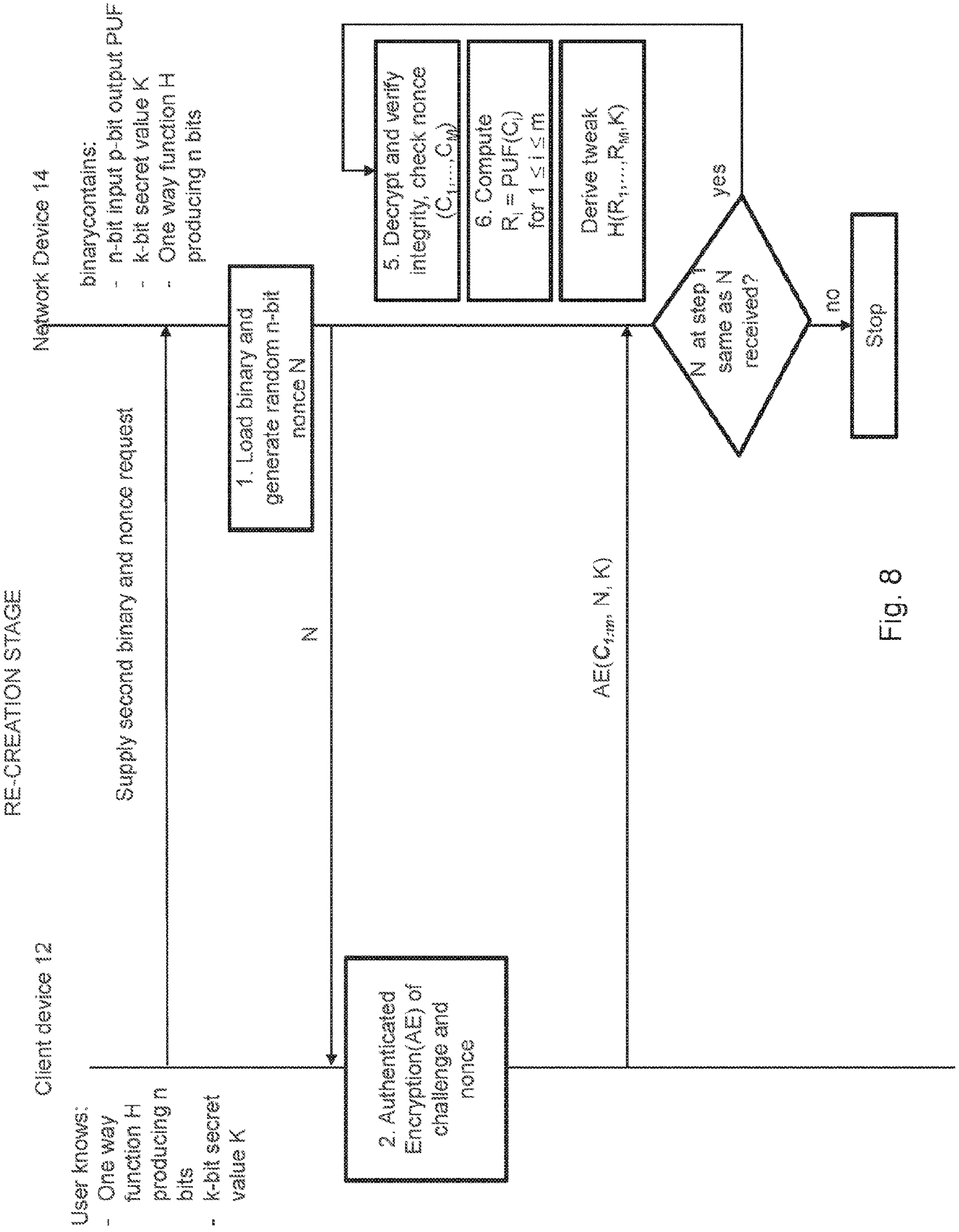
FIG. 8 is a flow diagram illustrating another example of a transformation vector recreation.

Examples of the transformation initialization stage are illustrated with respect to FIGS. 5 and 8.

As described with respect to FIGS. 2 and 3, in particular embodiments the transformation construction consists of two stages: (1) transformation vector initialization and (2) transformation vector recreation. In general, transformation construction may be summarized in the following steps.

Transformation vector initialization comprises: a client device including (optionally camouflaging) a secret within a first binary (e.g., bitstream or machine code); supplying the first binary to the network device (e.g., remote device, external device, etc.); using the secret on the network device to create challenges; providing the challenges to a PUF; returning the challenge responses to the client; and the client creates a transformation vector by using the challenge responses and a secret transformation.

Transformation vector recreation comprises: the client including (optionally camouflaging) the secret within a second binary (e.g., bitstream or machine code); supplying the second binary to the network device; the binary creating a nonce and supplying it to the client; supplying an IV, based on the nonce and the secret, to the network device; using the secret on the device and the client-supplied IV to create challenges; providing the challenges to the PUF; and using the challenge responses to recreate the transformation vector on the network device side. The respective steps are described in more detail below with respect to FIGS. 4-8.

A goal of the transformation vector initialization stage is to enable the user to collect a set of challenge-response pairs (CRPs) from the PUF without disclosing the CRPs to the hardware owner. An example of the components involved in the transformation vector initialization stage were described with respect to FIG. 2. The main steps of the transformation vector initialization stage are described in FIG. 4.

Figure 4:
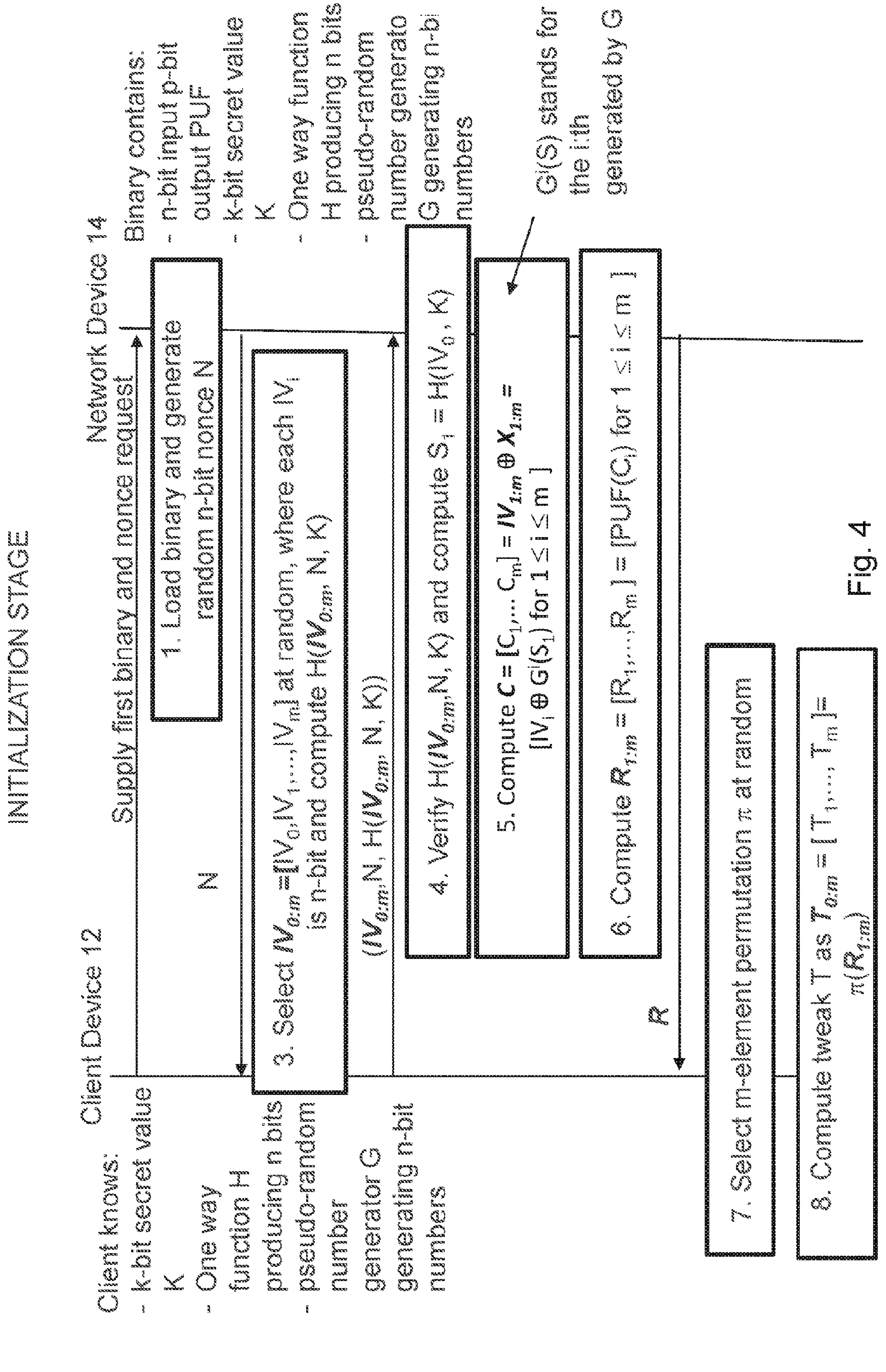
FIG. 4 is a flow diagram illustrating an example of a transformation vector initialization.

FIG. 4 is a flow diagram illustrating an example of a transformation vector initialization. Before the initialization, the client hides into the FPGA device a k-bit secret value K, by supplying a first binary (e.g., bitstream or machine code). This can be done, e.g., by hiding '0' and '1' constants constituting K into the binary. Some embodiments may use obfuscation techniques such as opaque predicates as described in "Stealthy Opaque Predicates in Hardware-Obfuscating Constant Expressions at Negligible Overhead," Max Hoffmann, Christof Paar, IACR Transactions on Cryptographic Hardware and Embedded Systems, 2018, vol. 2, pp. 277-297, or encoding K into a finite state register (FSR) as described in "Secure key storage using state machines," Nan Li, Shohreh Sharif Mansouri, Elena Dubrova, Proc. of IEEE 43rd International Symposium on Multiple-Valued Logic, 2013, pp. 290-295, DOI: 10.1109/ISMVL.2013.50.

Optionally, the client device (e.g., client device 12) requests the network device (e.g., network device 14), such as an FPGA, to send a nonce. The network device generates a nonce N and returns it to the user (step 1).

Figure 6:
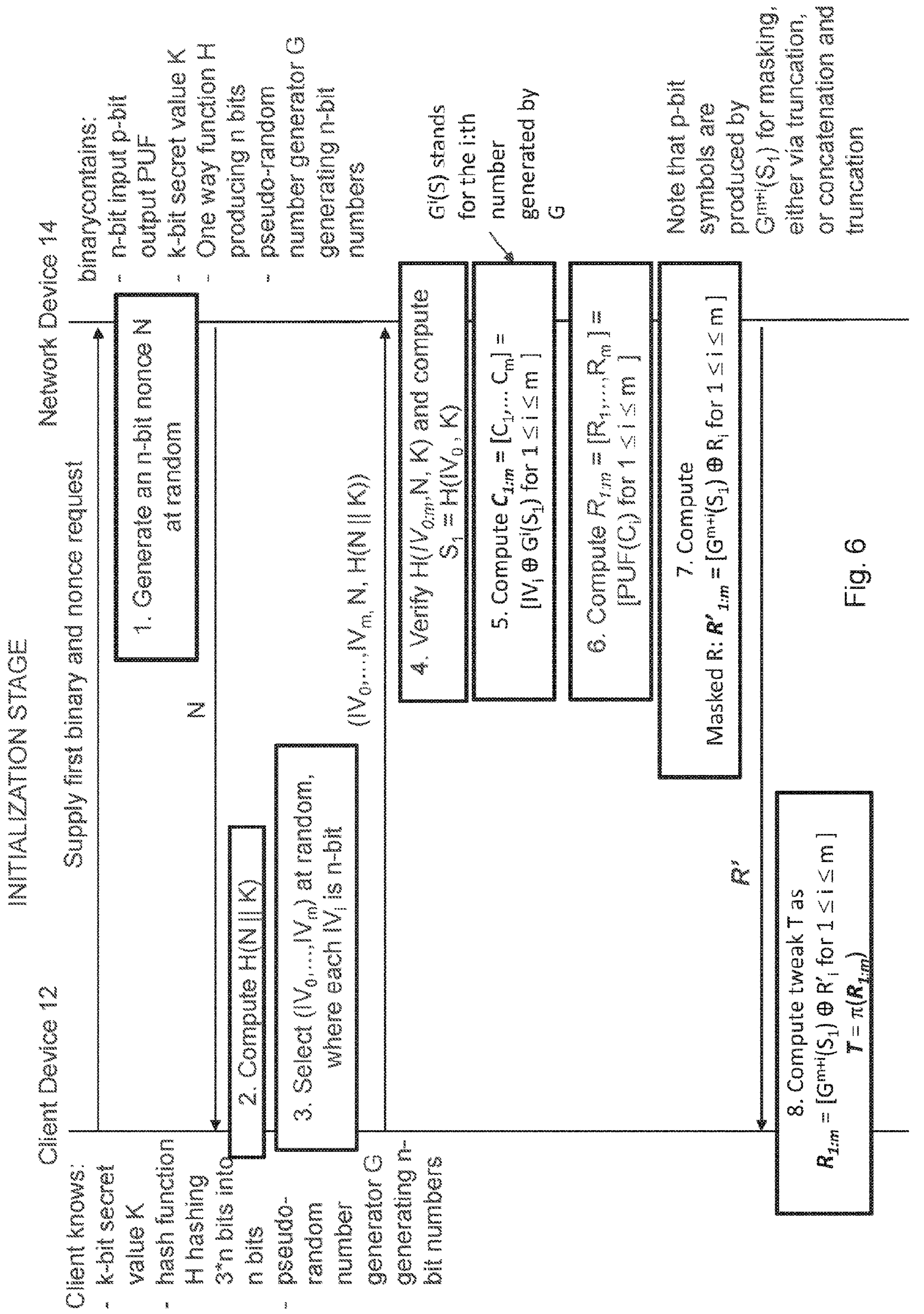
FIG. 6 is a flow diagram illustrating another example of a transformation vector initialization.

Optionally, the client inputs the received nonce N with the key K into a cryptographically secure one-way function H (step 2 illustrated in FIG. 6). The optional steps are used to authenticate the client to the network device to prevent, e.g., impersonation attacks.

The client then selects m+1 n-bit Initialization Vectors (IVs), $IV_{0:m}=[IV_0, IV_1, IV_2, \ldots, IV_m]$, from the set of all possible n-bit binary vectors $\{0,1\}^n$ (step 3). The IVs are communicated to the FPGA through a public channel and may be supplied together with the nonce N and an authentication tag, e.g., calculated using $H(IV_{0:m}, N, K)$.

The network device may compute an n-bit key $S_1$ by combining the $IV_0$ with the key K, e.g., by concatenation, and uses as input the result of the one-way function H (step 4).

Then, m n-bit challenges $C_i$ are computed by combining the IVs $IV_{1:m}=(IV_1, IV_2, \ldots, IV_m)$ with $X_{1:m}$, e.g. by the bitwise XOR (also denoted as ⊕), for all $1 \le i \le m$ (step 5). The challenges $(C_1, C_2, \ldots, C_m)$, are applied to the PUF to compute the PUF's responses $R_i=PUF(C_i)$, for all $1 \le i \le m$ (step 6). The resulting vector of responses $R_{1:m}=(R_1, \ldots, R_m)$ is sent back to the user. The responses may optionally be masked by an output of the PRNG to the distribution of responses $(R_1 \ldots R_m)$ or encrypted by a key, such a key may be K, or a key derived from K using a KDF, e.g., the PRNG. FIG. 6 illustrates the masked initialization procedure.

After receiving the responses, the user selects an m-element permutation π from the set of all possible m-element permutations (step 7). Then the user computes the m×p-bit tweak T as $T=\pi(R_{1:m})$, where π is the selected permutation (step 8) operating on m elements and each element of $R_{1:m}$ is a p-bit value.

While the hardware owner can observe IVs, $(IV_0, IV_1, IV_2, \ldots, IV_m)$, and PUF responses, $(R_1, \ldots, R_m)$, which are communicated through a public channel, he/she cannot re-create challenges $(C_1, C_2, \ldots, C_m)$ which were applied to generate the responses since the owner does not know $S_1$. The owner cannot re-compute $S_1$ because he/she does not know the secret key K. If the sizes of K and $S_1$ are sufficiently large, (e.g., ≥128), guessing K or $S_1$ by enumerating all possible choices is not possible. Thus, CRPs are not disclosed to the hardware owner.

The hardware owner cannot pretend to be the user and initialize the transformation vector themselves because the hardware owner cannot compute the authentication tag $H(IV_{0:m}, N, K)$ at step 2.

A goal of the transformation vector recreating stage is to enable the network device (e.g., FPGA) to recreate the transformation vector upon a command from the client. An example of the components involved in the transformation vector initialization stage were described with respect to FIG. 3. The main steps of the transformation vector recreation stage are illustrated in FIG. 5.

FIG. 5 is a flow diagram illustrating an example of a transformation vector recreation. First, the client (e.g., client device 12) supplies a second binary (e.g., bitstream or machine code) that uses the transformation vector. Example uses of the transformation vector are described in more detail below.

Optionally, error correcting codes (also known as helper data) associated with the PUF responses are supplied together with the binaries.

The client requests the network device (e.g., network device 14), such as an FPGA, to send a, e.g., n-bit, nonce. The network device generates a nonce N and returns it to the user (step 1).

The client selects one n-bit IV, $IV_0^*$, from the set of all possible n-bit binary vectors $\{0,1\}^n$ (step 2). Then the client combines the $IV_0^*$ with the received nonce N and the key K, e.g., by concatenation, and then inputs $(N, IV^*_0, K)$ to a one way function H to compute the session key $S_2$. The client also recreates the seed $S_1$ by combining the $IV_0$ with the key K. This may be done, for example, by a three-step process where the inputs are first concatenated, secondly padded to 3*n bits and finally supplied as an input to a one way function H (step 3).

The client then computes m n-bit IVs $IV^*_{1:m}=(IV_1^*, IV_2^*, \ldots, IV_m^*)$, as $IV_{1:m}=\pi(IV_{1:m} \oplus X_{1:m}) \oplus Y_{1:m}$ (step 4). The m+1 IVs and the nonce N, $(IV_0^*, IV_1^*, \ldots, IV_m^*, N)$, are communicated to the network device through a public channel.

The network device checks if the nonce N generated at step 1 is the same as the nonce received from the client. If not, the FPGA does not proceed with calculations. Otherwise, the network device recreates the seed $S_2$ by inputting N, the $IV_0^*$ and the key K into the one-way function H (step 5).

The network device then computes $IV^*_{1:m}=[IV^*_i+G^i(S_2)$ for all $1 \le i \le m]$ (step 6) and applies the resulting challenges to the PUF (step 7).

Because $IV^*_{1:m}=\pi(IV_{1:m} \oplus X_{1:m}) \oplus Y_{1:m}$, then $IV^*_{1:m} \oplus Y_{1:m}=\pi(IV_{1:m} \oplus X_{1:m}) \oplus Y_{1:m} \oplus Y_{1:m}=\pi(IV_{1:m} \oplus X_{1:m})$ (because $y \oplus y=0)=\pi(C_{1:m})$.

Because the challenge values $(C_{1:m}=[C1, \ldots, C_m])$ are individually applied to the PUF, and the permutation only changes the order of the values in the vector, the order in which the PUF derivation and the permutation is applied does not matter, i.e., denote $C^*_{1:m}=[C^*_1, \ldots, C^*_m]=\pi([C_i$ for $1 \le i \le m])$ then $[PUF(C^*_1), \ldots, PUF(C^*_m)]=\pi([PUF(C_1), \ldots, PUF(C_m)])$.

Optionally, error correcting codes may be applied to correct any PUF responses which have been erroneously generated.

By step 8 of the initialization stage, the resulting vector is the transformation vector T (also referred to as the tweak T).

The hardware owner cannot recreate the transformation vector because the hardware owner does not know the value K and thus cannot compute the seeds $S_1$ and $S_2$ which are required to generate a valid IV vector, $(IV_1^*, \ldots, IV_m^*)$.

A replay attack by reusing some previously used valid IV vector ($IV_1$*, . . . , $IV_m$*) is prevented by using a fresh nonce N for each session. Because N is used in the construction of $S_2$, appending an old IV vector ($IV_1$*, . . . , $IV_m$*) to a new nonce will not result in a valid combination.

As described above, the transformation vector is used as input when constructing a second binary (e.g., bitstream or machine code). Because the transformation vector is a device-unique secret, it may be used in several scenarios.

For example, the transformation vector may be used to alter particular functionality in the binary to only function correctly on the intended device. As one example, the transformation vector may be supplied as a starting state to a state machine or as an input to neurons, adders or multipliers in a neural network. Because these functions expect certain inputs, altering them on a different device will result in incorrect state transitions and outputs.

As another example, the transformation vector may be used to lock certain functionality to only be activated when receiving the correct transformation vector, e.g., by providing the transformation vector to a series of logic gates that must provide the correct output to stop another logic gate from holding the clock signal to certain blocks.

As another example, the transformation vector may be used to derive a symmetric encryption key, to ensure data may only be decrypted on a specific device that has deployed a binary that is able to recreate the transformation vector. In some embodiments, the transformation vector may be used to encrypt a starting state in a state machine.

As another example, the transformation vector may be used to derive an asymmetric encryption key, which can be used for authentication, i.e., to assure the client that the client is communicating with a specific device.

In some embodiments, the PUF in the examples described above is replaced by a keyed MAC, i.e. a MAC that uses a secret key to create a unique result. In these embodiments, the secret key may be programmed on the device, e.g., in OTP memory not accessible to the device owner.

Figure 7:
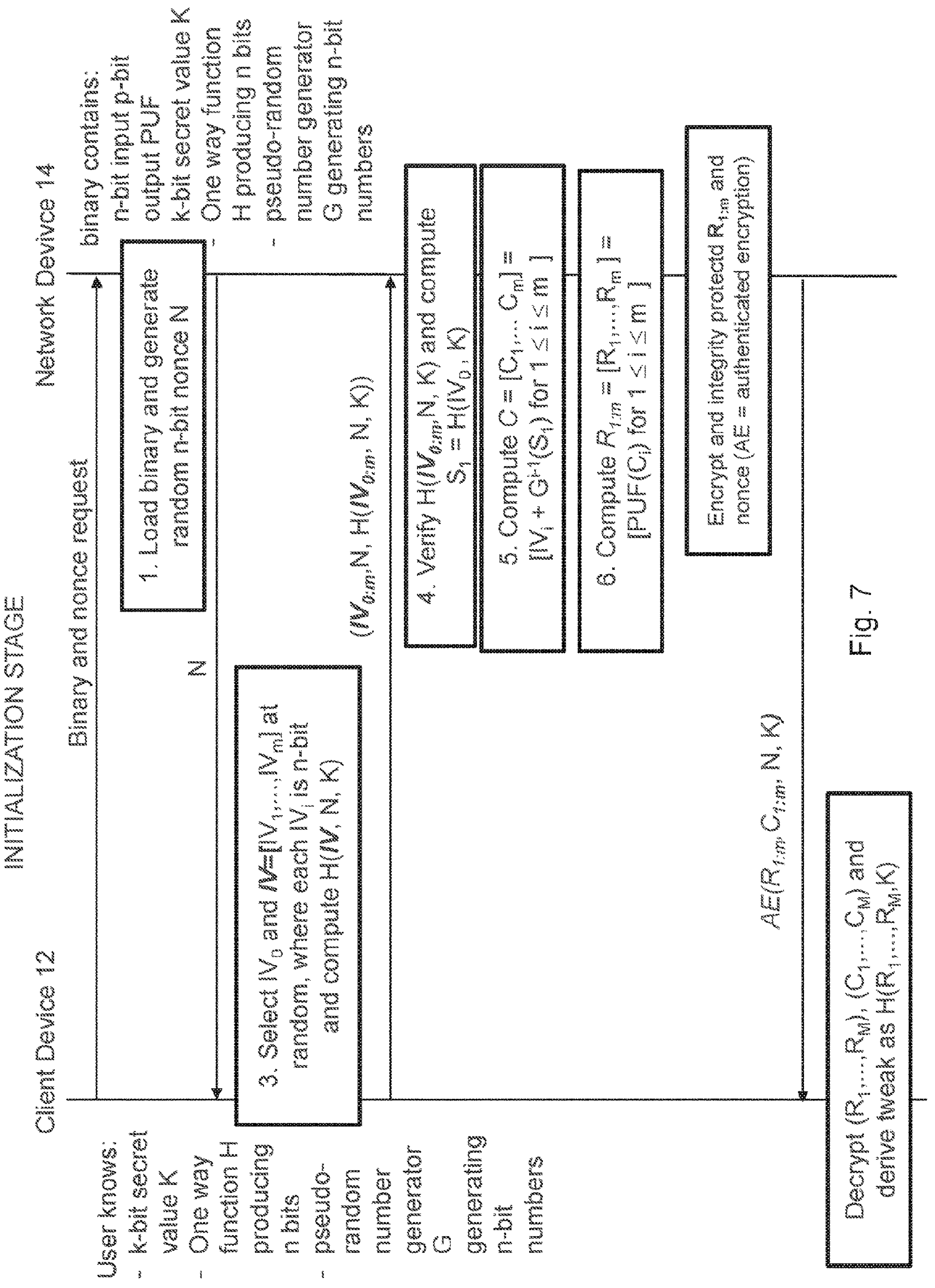
FIG. 7 is a flow diagram illustrating another example of a transformation vector initialization.

In some embodiments, the network device (e.g., FPGA) returns the challenge vector $C_{1:m}$ and $R_{1:m}$ in encrypted and integrity protected form to the client at the initialization stage. An example is illustrated in FIG. 7. The key used for protection may be the secret K, another secret hidden in the binary, or a key derived from K using a KDF.

At the transformation vector recreation stage, the user sends the challenges and the nonce back in encrypted and integrity protected form to the network device (e.g., FPGA) using the same key. The network device decrypts and verifies the integrity of the message. The decrypted vector $C_{1:m}$ is used as a challenge to the PUF and the resulting vector $R_{1:m}$ is used to derive the transformation vector. In this embodiment, $R_{1:m}$ may be directly used as a transformation vector, but any suitable operation can also be used to derive a transformation vector from $R_{1:m}$, e.g., hash function or a MAC as illustrated in FIG. 8.

In some embodiments, an FPGA bitstream may be replaced by a software binary and camouflaging may be replaced by well-known software obfuscation techniques such as dummy code insertion, instruction pattern transformation or opaque predicate insertion. If the PUF is not implemented as a part of the software binary, the PUF may be a separate entity in such an embodiment.

In some embodiments, instead of using a PRNG to create and recreate the challenges, the challenges are chosen at random by the client and are supplied in an encrypted form. The encryption key is derived directly from the secret. This adds the burden of using an encryption algorithm in both binaries on the device but removes the need of using a PRNG.

As one example use case, a company A has a proprietary bitstream B that performs certain acceleration tasks on an FPGA. Company A uses Company C's FPGA-as-a-service offering and wants to deploy bitstream B in one or several devices.

To counter the risk of IP theft, e.g., by rogue Company Y employee or by Company Y performing industry espionage, Company A does not want to expose a fully working, plaintext bitstream to Company C.

Instead, by using particular embodiments, Company A supplies a first bitstream that extracts CRPs from the N devices in the FaaS offering that will be used. Company A receives CRP's, calculates a transformation vector T for each device and uses each transformation vector to create a unique bitstream for each device. I.e., bitstream B is diversified into N different bitstreams, each valid for a single device where B1 has embedded secret $S_1$ and expects the transformation vector from the first device, B2 has embedded secret $S_2$ and expects the transformation vector of the second device, etc.

Each time a diversified bitstream is supplied to the FaaS, the bitstream supplies a nonce which Company A uses to calculate a session unique IV based on $S_x$. Only Company A can calculate the IV unless the secret transformation scheme and $S_x$ can be reverse engineered, making the bitstream difficult to steal to use on either the same, or a different device.

As another example use case, a company Z that manufacturers bitstreams for licensing wants to protect a licensed bitstream from being over-deployed. A company W purchases five licenses for different devices. Company Z supplies five "first bitstreams", each with its own secret, to Company W and asks them to supply the resulting responses. By using the responses, the device-unique transformation vector T is used to create a diversified bitstream for each device.

Company W receives five different "second bitstreams", each for one licensed device. They can only be used on the identified device. Because company W does not know the secret in the bitstream, nor the transformation that is used to create the transformation vector, it is not possible to extract any information from the above steps. If Company W would like to cheat and supply a different set of responses, it would only result in the licensed bitstream not working on the device.

In this case, the nonce for the transformation vector recreation phase may be omitted and a static IV may be supplied to company Z. Alternatively, company W may be required to contact company Z when deploying the bitstream to get the correct IV.

Furthermore, company Z may also update the embedded secret and/or transformation if the bitstream is updated, to require company W to purchase a new license for the new IP.

There are particular advantages for hiding a key in a bitstream. For example, it is possible to use a camouflaging technique to include a secret in a bitstream directly as a cryptographic key and omit the usage of a PUF. However, this is not beneficial from a licensing point-of-view because the cryptographic key will be the same on every device.

Using the secret in combination with the device-unique unclonable function ensures that the transformation vector, which may in turn be used to create a cryptographic key, is only available when deployed on the correct device.

However, the secret does not necessarily need to be used to derive a seed for a PRNG. It is possible to use the secret as a key to protect the incoming challenges.

Figure 9:
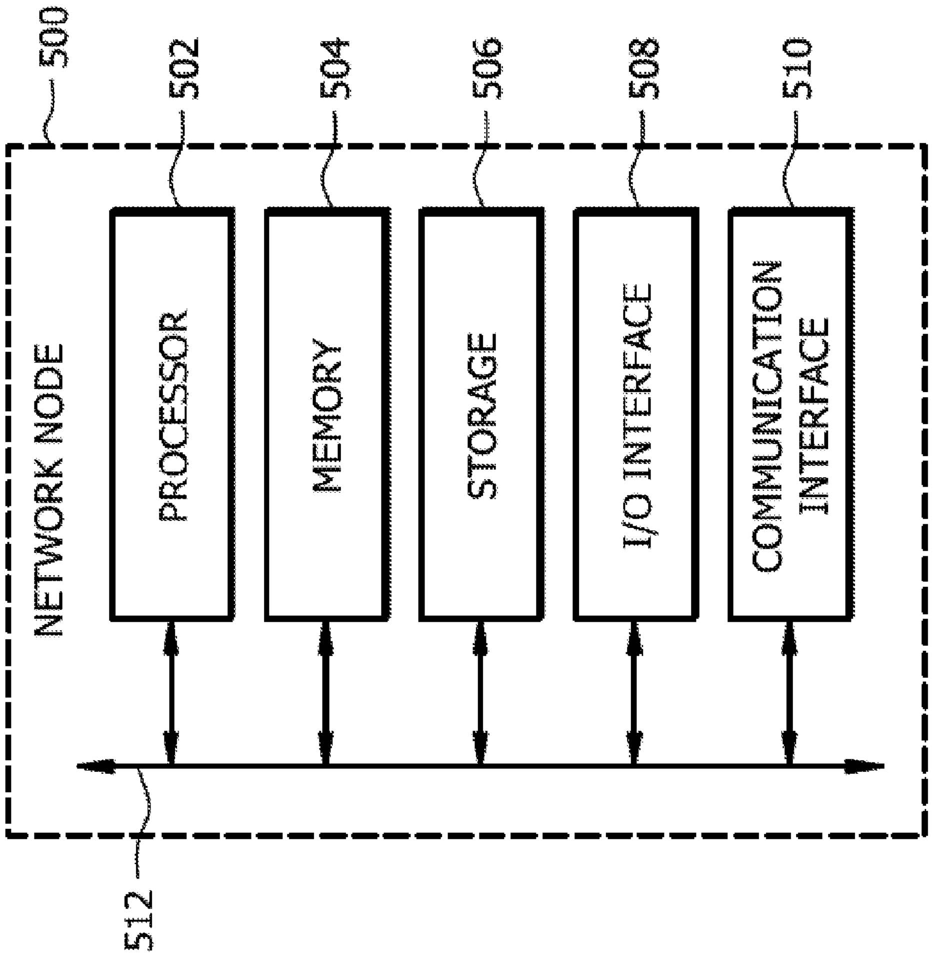
FIG. 9 is a block diagram illustrating an example network node, according to particular embodiments.

FIG. 9 is a block diagram illustrating an example network node, according to particular embodiments. A network node may include client device 12 and/or network device 14.

In particular embodiments, one or more network nodes 500 perform one or more steps of one or more methods described or illustrated herein. In particular embodiments, one or more network nodes 500 provide functionality described or illustrated herein, such as the functionality described with respect to FIGS. 4-8, 10 and 11. In particular embodiments, software running on one or more network nodes 500 performs one or more steps of one or more methods described or illustrated herein or provides functionality described or illustrated herein. Particular embodiments include one or more portions of one or more network nodes 500. Herein, reference to a network node, client device, or network device may encompass a computing device, and vice versa, where appropriate. Moreover, reference to a network node may encompass one or more network nodes, where appropriate.

Particular embodiments may include any suitable number of network nodes 500. Network node 500 may take any suitable physical form. As example and not by way of limitation, network node 500 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a server, or a combination of two or more of these. Where appropriate, network node 500 may include one or more network nodes 500; be unitary or distributed; span multiple locations; span multiple machines; span multiple data centers; or reside in a cloud, which may include one or more cloud components in one or more networks.

Where appropriate, one or more network nodes 500 may perform without substantial spatial or temporal limitation one or more steps of one or more methods described or illustrated herein. As an example and not by way of limitation, one or more network nodes 500 may perform in real time or in batch mode one or more steps of one or more methods described or illustrated herein. One or more network nodes 500 may perform at different times or at different locations one or more steps of one or more methods described or illustrated herein, where appropriate.

In particular embodiments, network node 500 includes a processor 502, memory 504, storage 506, an input/output (I/O) interface 508, a communication interface 510, and a bus 512. Although this disclosure describes and illustrates a particular network node having a particular number of particular components in a particular arrangement, particular embodiments may include any suitable computer system having any suitable number of any suitable components in any suitable arrangement. For example, in some embodiments network node 500 may comprise an FPGA.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. Processor 502 may include any suitable number of any suitable internal caches, where appropriate.

As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502.

In particular embodiments, processor 502 may include one or more internal registers for data, instructions, or addresses. Processor 502 may include any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, particular embodiments may include any suitable processor.

In particular embodiments, memory 504 includes main memory for storing instructions for processor 502 to execute or data for processor 502 to operate on. As an example and not by way of limitation, network node 500 may load instructions from storage 506 or another source (such as, for example, another computer system 700) to memory 504. Processor 502 may then load the instructions from memory 504 to an internal register or internal cache.

To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or else-where) and operates only on data in one or more internal registers or internal caches or in memory 504 (as opposed to storage 506 or elsewhere).

One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. Particular embodiments may include any suitable RAM. Memory 504 may include one or more memories 504, where appropriate. Although this disclosure describes and illustrates particular memory, particular embodiments may include any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to network node 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 506 may take any suitable physical form.

Storage 506 may include one or more storage control units facilitating communication between processor 502 and storage 506, where appropriate. Where appropriate, storage 506 may include one or more storages 506. Although this disclosure describes and illustrates particular storage, particular embodiments may include any suitable storage.

In particular embodiments, I/O interface 508 includes hardware, software, or both, providing one or more interfaces for communication between network node 500 and one or more I/O devices. Network node 500 may include one or more of these I/O devices, where appropriate. One or more of these I/O devices may enable communication between a person and network node 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. Particular embodiments may include any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, particular embodiments may include any suitable I/O interface. In particular embodiments, I/O interface 508 may include an interface to a remote network management system.

In particular embodiments, communication interface 510 includes hardware, software, or both providing one or more interfaces for communication (such as, for example, packet-based communication) between network node 500 and one or more other network nodes 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network.

Particular embodiments may include any suitable network, such as network 100 illustrated in FIG. 1, and any suitable communication interface 510 for it. As an example and not by way of limitation, network node 500 may communicate with an ad hoc network, a personal area network (PAN), a LAN, WAN, MAN, or one or more portions of the Internet or a combination of two or more of these. One or more portions of one or more of these networks may be wired or wireless. As an example, network node 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Network node 500 may include any suitable communication interface 510 for any of these networks, where appropriate. Communication interface 510 may include one or more communication interfaces 510, where appropriate. Although this disclosure describes and illustrates a particular communication interface, particular embodiments may include any suitable communication interface.

In particular embodiments, bus 512 includes hardware, software, or both coupling components of network node 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, particular embodiments may include any suitable bus or interconnect.

Figure 10:
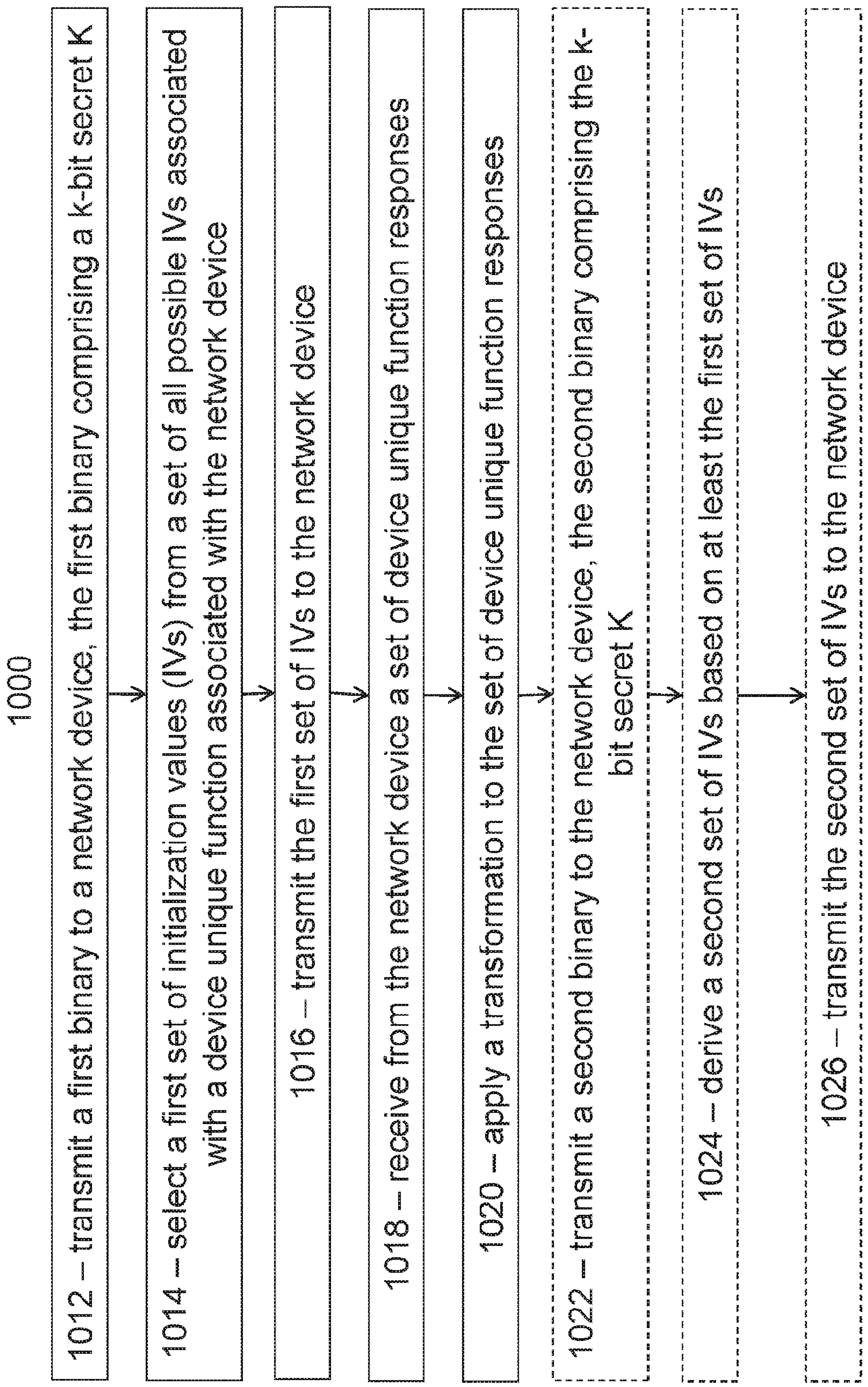
FIG. 10 is a flow diagram illustrating an example method in a client device.

FIG. 10 is a flowchart illustrating an example method in a client device, according to certain embodiments. In particular embodiments, one or more steps of FIG. 10 may be performed by client device 12 described with respect to FIGS. 1-9.

The method may begin at step 1012, where a client device (e.g., client device 12) transmits a first binary to a network device (e.g., network device 14). The first binary comprises a k-bit secret K. The secret K may comprise the secret described according to any of the embodiments and examples described herein. The client device may transmit the first binary (e.g., bitstream, machine code, etc.) to the network device according to the examples described with respect to FIGS. 1-8.

In particular embodiments, the secret K may be camouflaged according to any of the embodiments and examples described herein.

At step 1014, the client device selects a first set of initialization values (IVs) from a set of all possible IVs associated with a device unique function associated with the network device. The client device may select the IVs according to any of the embodiments and examples described herein.

At step 1016, the client device transmits the first set of IVs to the network device. The client device may transmit the IVs to the network device according to the examples described with respect to FIGS. 1-8.

At step 1018, the client device receives from the network device a set of device unique function responses. The device unique function responses were generated by the network device based on challenges derived from the first set of IVs and the secret K. The device unique function responses may be generated according to any of the examples and embodiments described herein.

At step 1020, the client device applies a transformation to the set of device unique function responses resulting in a transformation vector. In particular embodiments, the transformation comprises one or more of a permutation, substitution, masking, demasking, encryption, decryption, and/or any other transformation described herein.

At step 1022, the client device may transmit a second binary to the network device. The second binary comprises the k-bit secret K, and operation of the second binary is dependent on the transformation vector. The second binary is described in more detail with respect to FIGS. 3, 5 and 8.

In particular embodiments, the first binary and the second binary further comprise one or more of a one way function H, a random number generator G, and/or the device unique function, according to any of the embodiments and examples described herein.

At step 1024, the client device derives a second set of IVs based on at least the first set of IVs. The second set of IVs is described in more detail with respect to FIGS. 3, 5 and 8.

At step 1026, the client device transmits the second set of IVs to the network device. In particular embodiments, operation of the second binary is dependent on the transformation vector to provide input to a state machine or logic gates. Operation of the second binary may be dependent on the transformation vector to generate a cryptographic key.

In particular embodiments, the network device comprises a FPGA and the first and second binaries comprise programmable logic instructions. The network device may comprise a processing element and the first and second binaries may comprise machine code.

In particular embodiments, the device unique function comprises one of a physically unclonable function (PUF) and a message authentication code (MAC). The device unique function may be implemented as one or more of a hardware implementation on the network device, a part of the first binary and a part of the second binary.

Modifications, additions, or omissions may be made to method 1000 of FIG. 10. Additionally, one or more steps in the method of FIG. 10 may be performed in parallel or in any suitable order.

Figure 11:
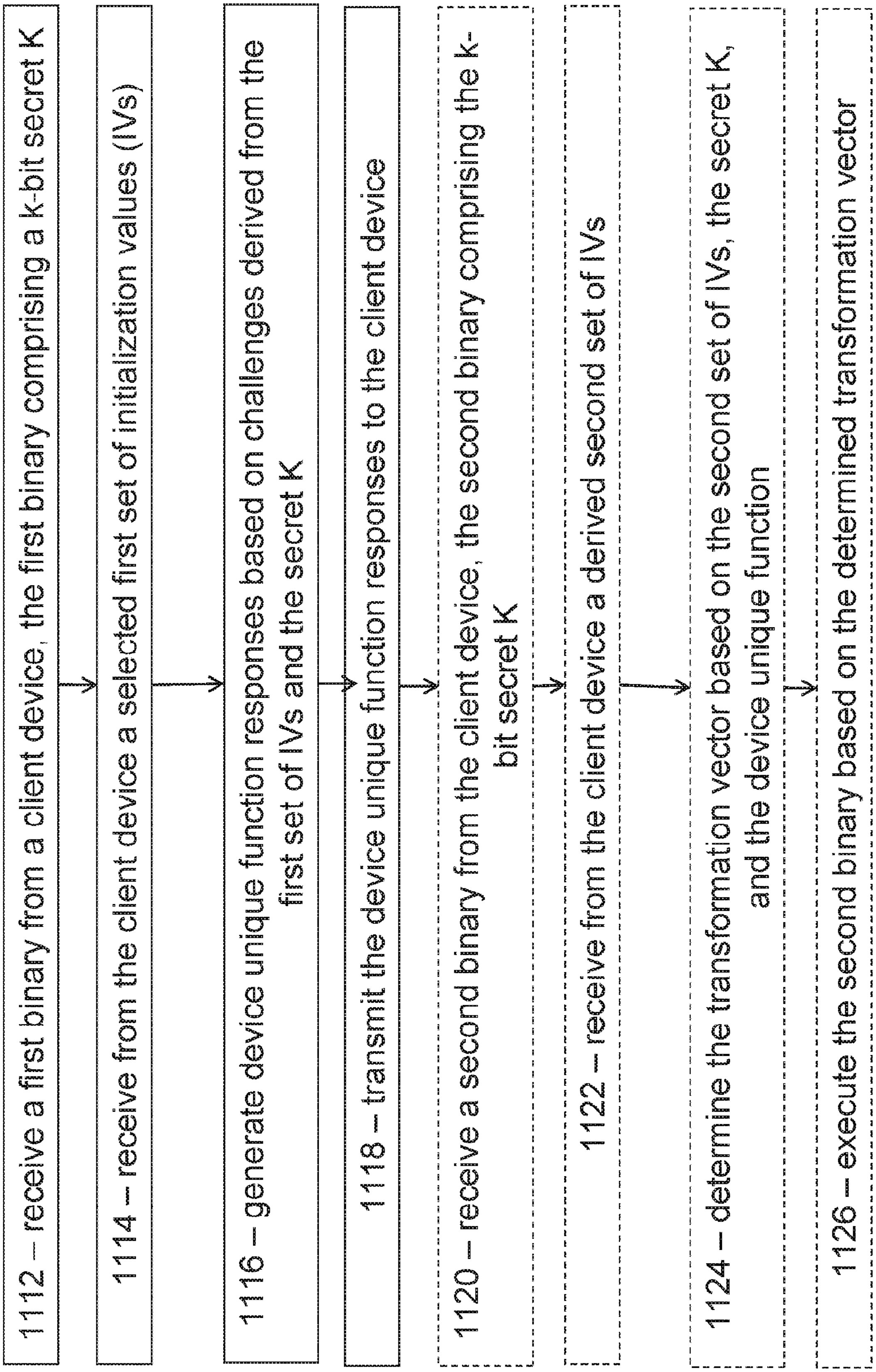
FIG. 11 is a flow diagram illustrating an example method in a network device.

FIG. 11 is a flowchart illustrating an example method in a network device, according to certain embodiments. In particular embodiments, one or more steps of FIG. 11 may be performed by network device 14 described with respect to FIGS. 1-9.

The method may begin at step 1112, where a network device (e.g., network device 14) receives a first binary from a client device (e.g., client device 12). The first binary comprises a k-bit secret K. The secret K may comprise the secret described according to any of the embodiments and examples described herein.

At step 1114, the network device receives from the client device a selected first set of initialization values (IVs). The selection of the first set of IVs is described in more detail with respect to FIGS. 1-8.

At step 1116, the network device generates device unique function responses based on challenges derived from the first set of IVs and the secret K. The network device may generate the responses according to any of the embodiments and examples described herein.

At step 1118, the network device transmits the device unique function responses to the client device. The client device may use the responses to generate a transformation vector.

At step 1120, the network device may receive a second binary from the client device. The second binary comprises the k-bit secret K, and operation of the second binary is dependent on a transformation vector.

At step 1122, the network device receives from the client device a derived second set of IVs. The derivation of the second set of IVs is described in more detail with respect to FIGS. 3, 5 and 8.

At step 1124, the network device determines the transformation vector based on the second set of IVs, the secret K, and the device unique function. The network node may determine the transformation vector according to any of the examples and embodiments described herein.

At step 1126, the network device executes, configures and/or deploys the second binary based on the determined transformation vector.

Modifications, additions, or omissions may be made to method 1100 of FIG. 11. Additionally, one or more steps in the method of FIG. 11 may be performed in parallel or in any suitable order.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

The invention claimed is:

1. A method performed by a client device, the method comprising:

transmitting a first binary to a network device, the first binary comprising a k-bit secret K;

selecting a first set of initialization values (IVs) from a set of all possible IVs associated with a device unique function associated with the network device;

transmitting the first set of IVs to the network device;

receiving from the network device a set of device unique function responses, wherein the device unique function responses are generated based on challenges derived from the first set of IVs and the secret K;

applying a transformation to the set of device unique function responses resulting in a transformation vector;

transmitting a second binary to the network device, the second binary comprising the k-bit secret K and wherein operation of the second binary is dependent on the transformation vector;

deriving a second set of IVs based on at least the first set of IVs; and transmitting the second set of IVs to the network device.

2. The method of claim 1, wherein the transformation comprises one or more of a permutation, substitution, masking, demasking, encryption, and decryption.

3. The method of claim 1, wherein the secret K is camouflaged.

4. The method of claim 1, wherein the first binary further comprises one or more of a one way function H, a random number generator G, and the device unique function.

5. A client device comprising processing circuitry operable to:

transmit a first binary to a network device, the first binary comprising a k-bit secret K;

select a first set of initialization values (IVs) from a set of all possible IVs associated with a device unique function associated with the network device;

transmit the first set of IVs to the network device;

receive from the network device a set of device unique function responses, wherein the device unique function responses are generated based on challenges derived from the first set of IVs and the secret K;

apply a transformation to the set of device unique function responses resulting in a transformation vector;

transmit a second binary to the network device, the second binary comprising the k-bit secret K and wherein operation of the second binary is dependent on the transformation vector;

derive a second set of IVs based on at least the first set of IVs; and transmit the second set of IVs to the network device.

6. The client device of claim 5, wherein the transformation comprises one or more of a permutation, substitution, masking, demasking, encryption, and decryption.

7. The client device of claim 5, wherein the secret K is camouflaged.

8. The client device of claim 5, wherein the first binary further comprises one or more of a one way function H, a random number generator G, and the device unique function.

9. The client device of claim 5, wherein the second binary further comprises one or more of a one way function H, a random number generator G, and the device unique function.

10. The client device of claim 5, wherein operation of the second binary is dependent on the transformation vector to provide input to a state machine or logic gates.

11. The client device of claim 5, wherein operation of the second binary is dependent on the transformation vector to generate a cryptographic key.

12. A method performed by a network device, the method comprising:

receiving a first binary from a client device, the first binary comprising a k-bit secret K;

receiving from the client device a selected first set of initialization values (IVs) from a set of all possible IVs associated with a device unique function associated with the network device;

generating device unique function responses based on challenges derived from the first set of IVs and the secret K;

transmitting the device unique function responses to the client device;

receiving a second binary from the client device, the second binary comprising the k-bit secret K and wherein operation of the second binary is dependent on a transformation vector;

receiving from the client device a derived second set of IVs based on at least the first set of IVs;

determining the transformation vector based on the second set of IVs, the secret K, and the device unique function; and executing the second binary based on the determined transformation vector.

13. The method of claim 12, wherein the transformation comprises one or more of a permutation, substitution, masking, demasking, encryption, and decryption.

14. A network device comprising processing circuitry-operable to:

receive a first binary from a client device, the first binary comprising a k-bit secret K;

receive from the client device a selected first set of initialization values (IVs) from a set of all possible IVs associated with a device unique function associated with the network device;

generate device unique function responses based on challenges derived from the first set of IVs and the secret K;

transmit the device unique function responses to the client device;

receive a second binary from the client device, the second binary comprising the k-bit secret K and wherein operation of the second binary is dependent on a transformation vector;

receive from the client device a derived second set of IVs based on at least the first set of IVs;

determine the transformation vector based on the second set of IVs, the secret K, and the device unique function; and execute the second binary based on the determined transformation vector.

15. The network device of claim 14, wherein the transformation comprises one or more of a permutation, substitution, masking, demasking, encryption, and decryption.

16. The network device of claim 14, wherein the secret K is camouflaged.

17. The network device of claim 14, wherein the first binary further comprises one or more of a one way function H, a random number generator G, and the device unique function.

18. The network device of claim 14, wherein the second binary further comprises one or more of a one way function H, a random number generator G, and the device unique function.

19. The network device of claim 14, wherein operation of the second binary is dependent on the transformation vector to provide input to a state machine or logic gates.

20. The network device of claim 14, wherein operation of the second binary is dependent on the transformation vector to generate a cryptographic key.

21. The network device of claim 14, wherein the network device comprises a field programmable gate array (FPGA) and the first and second binaries comprise programmable logic instructions.

22. The network device of claim 14, wherein the network device comprises a processing element and the first and second binaries comprise machine code.

23. The network device of claim 14, wherein the device unique function comprises one of a physically unclonable function (PUF) and a message authentication code (MAC).

* * * * *